United States Patent
Bryngdahl

[11] 3,897,136
[45] July 29, 1975

[54] POLARIZATION-GRATING MOIRE
[75] Inventor: Olof Bryngdahl, Cupertino, Calif.
[73] Assignee: Xerox Corporation, Stamford, Conn.
[22] Filed: Mar. 9, 1973
[21] Appl. No.: 339,676

[52] U.S. Cl. .............. 350/159; 350/157; 250/237 G
[51] Int. Cl. ............................................. G02b 5/30
[58] Field of Search ........... 350/147, 154, 157, 159, 350/162; 250/237 G

[56] References Cited
UNITED STATES PATENTS

| | | | |
|---|---|---|---|
| 2,617,329 | 11/1952 | Dreyer | 350/159 |
| 2,753,763 | 7/1956 | Haines | 350/157 |
| 3,431,044 | 3/1969 | Clark | 350/159 |
| 3,453,037 | 7/1969 | Middleton | 350/159 |
| 3,538,322 | 11/1970 | Arsem | 350/159 |

Primary Examiner—Alfred E. Smith
Assistant Examiner—Michael J. Tokar
Attorney, Agent, or Firm—James J. Ralabate; Terry J. Anderson; John H. Chapman

[57] ABSTRACT

The present invention relates to the formation of moire patterns. At least two grating structures with periodic variation of polarization are superpositioned in a defined optical path to produce moire-fringe patterns of a higher resolution than that of the conventional moire with absorption gratings.

16 Claims, 5 Drawing Figures

POLARIZATION-GRATING MOIRE

BACKGROUND

This invention relates to a method and apparatus for forming moire patterns, and more particularly to moire pattern formation through the superposition of grating structures.

The formation of moire patterns was described by Lord Rayleigh in 1874, who was the first to use it for studies of grating irregularities. Moire effects obtained with absorption and phase gratings have been analyzed extensively by Guild, The Interference Systems of Crossed Diffraction Gratings - Therory of Moire Fringes (Oxford, London, 1956). Absorption gratings can be used to give moire effects in incoherent light. However, certain disadvantages with such approaches at times limit their practical applicability. For example, the period of the moire-fringe pattern is required to be more than an order of magnitude larger than the period of the gratings. Also, unwanted fringe systems are superimposed on the desired one. Moreover, generation of moire patterns using phase gratings is limited to the use of coherent light.

It is thus an object of the present invention to provide an alternative method of forming moire-fringe patterns which does not have such difficulties.

It is the further object of the present invention to form moire-fringe patterns by using the superposition of grating structures.

It is yet another object of the present invention to form moire-fringe patterns by means of the superposition of grating structures which have a periodic variation of polarization.

Other objects of the invention will be evident from the description hereinafter presented.

SUMMARY OF THE INVENTION

The invention provides the superposition of grating structures which have periodic variation of polarization.

Another feature of the invention is that the grating structures may be illuminated by coherent as well as incoherent light, yet forming moire-fringe patterns which have increased resolution, and arbitrarily variable contrast of the pattern, and a single-frequency moire pattern.

Another feature of the invention is that the employment of polarization gratings in superposition allow for much higher frequencies than result in prior art techniques.

It is still another feature of the invention that the amount of modulation of the moire pattern may be controlled by controlling the polarization directions of the gratings by introducing a one-half wave plate and controlling its rotation.

These and other features which are considered to be characteristic of this invention are set forth with particularity in the appended claims. The invention itself, however, as well as additional objects and advantages thereof, will best be understood from the following description when considered in conjunction with the accompanying drawings.

DESCRIPTION OF THE PREFERRED EMBODIMENT

Figure 1:
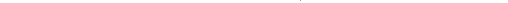
FIG. 1 represents four different polarization-grating configurations.
Figure 1:
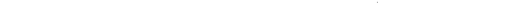

In FIG. 1 is shown various polarization-grating configurations. Polarization gratings may be formed to have differing characteristics. As shown in (a) and (b) of FIG. 1, polarization gratings may have a strictly bipolar character such that only two mutually orthogonal states of polarization can occur. As shown in (c) and (d) of FIG. 1, polarization gratings may be formed with a continuous transition between different states of polarization. Hybrid configurations are also possible, in which, the amplitude and/or the phase, as well as the polarization, may also vary in a periodic fashion. The invention provides for the superposition of polarization gratings having many of these characteristics and yet be capable of forming moire-fringe patterns. Moire-fringe patterns may also arise as the result of the superposition of pure polarization gratings.

The polarization gratings considered in this preferred embodiment are periodic in the sense that orthogonal states of polarized light are alternately transmitted. Moire fringes are formed when two of these gratings are superposed. Light is transmitted at the locations where the states of polarization of the respective gratings are the same and blocked where they are orthogonal. In the case of two regular gratings polarized in the circular states superpositioned to form moire patterns, two types of relative movements, translation and rotation, can occur. The resulting moire patterns generally have lower spatial frequencies in the periodic structures that create them. Therefore, a low-pass filter (not shown) may be used in the optical path defined by the gratings in order to eliminate disturbing frequency components. This condition would be represented by the relationship: $|(D_1 - D_2)/D_1| << 1$ and $|2\alpha| << 1$, where $D_1$ and $D_2$, respectively, are the periods of the gratings and $2\alpha$ is the relative angle between the gratings. Circular polarizers may be made by combining a linear polarizer and a linear $\pi/2$ retarder. Unpolarized light is preferably used for the production of the polarization-grating moire so that equal amounts of light are transmitted by the two grating components, independent of the orientation of the grating. This results in a desirable irradiance distribution.

A relative rotation between two binary polarization gratings with almost identical frequencies results in a moire pattern with the same frequency as the moire formed with two corresponding absorption gratings. If the two superposed binary polarization gratings are laterally displaced relative to each other, the result is a periodic irradiance pattern with double the frequency that is obtained from a superposition of two corresponding absorption gratings. Compared to the single transmittance structure of the prior art absorption gratings, two binary polarization gratings give the same structure twice, in such a way that the two structures are interlaced with each other. The lowest spatial frequencies in the X and Y directions, i.e., in direction bisecting the directions of variations in the two polarization gratings, are the same as those obtained for corresponding absorption gratings. However, it is notable that the frequency components corresponding to the gratings are less disturbing when polarization gratings are used and can be suppressed completely with the utilization of polarization gratings with linear variations.

Several feasibility experiments have been performed to demonstrate the characteristic features of moire patterns formed by polarization gratings. The gratings used were formed from strips cut in different directions out of linearly dichroic polarizer sheets. The gratings were assembled so that between successive strips a constant amount of rotation of the transmittance axes occurred. Two types of gratings were made:

1. $\pi/2$ rotation between successive strips, i.e., alternate mutually orthogonally polarizing strips, and
2. $\pi/6$ rotation between successive strips, i.e., six strips per period of the grating.

The polarizing strips were 2–4 mm in width and sandwiched between thin glass plates. The size of the gratings ranged from 12×12 to 24×24 cm$^2$.

Moire patterns were formed by transillumination of two gratings in contact. A conventional light table served as an unpolarized light source. Thus, the first grating functioned as a polarizer and the second functioned as an analyzer. Extinction of the light occurs in those locations where the states of polarization transmitted by the two gratings are orthogonal and maximum light where they are equal. The irradiance variation in the moire pattern will vary with the relative angle between the gratings, unless their components are alternately right and left circular polarizers or unless the transmittance axes of a linear polarizer is rotated continuously over the grating.

Figure 2:
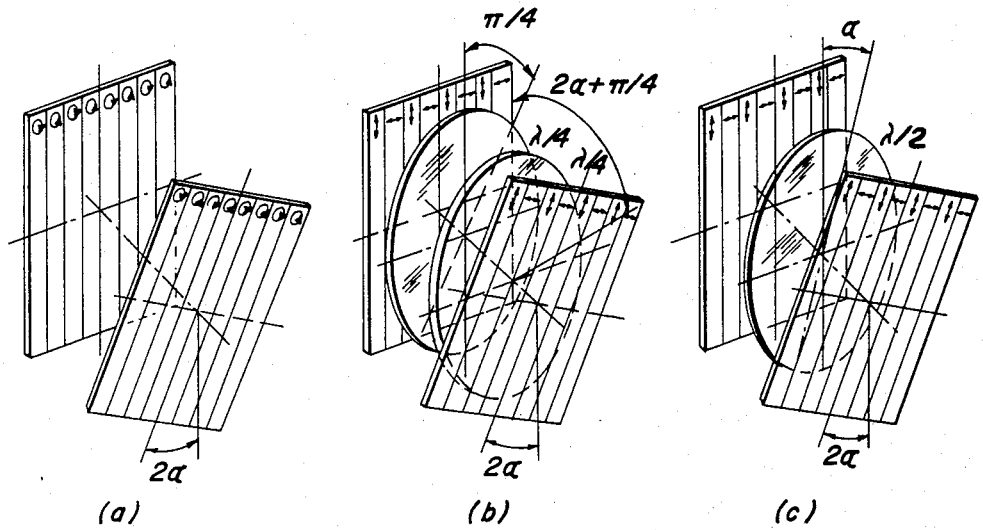
FIG. 2 shows various arrangements for obtaining moire patterns with gratings that introduce alternate mutually orthogonal states of polarization.

With two mutually orthogonal polarization-state gratings as shown in FIG. 2 (a), the contrast in the moire pattern is independent of the angle $2\alpha$ because the sense of circular polarization does not change with the relative angle between the gratings. If the gratings are formed of linear polarizers as shown in (b) and (c) of FIG. 2, however, a means for rotating their direction of polarization is required. In FIG. 2 (b), $\lambda/4$ plates are attached to the gratings so that the fast axes bisect the two orthogonal directions of the polarizers such that conventional polarizers and analyzers for right- and left-circularly polarized light are provided. In FIG. 2 (c), a $\lambda/2$ plate is used to rotate the directions of polarization obtained after the first grating to coincide with those of the second grating. This embodiment requires that the $\lambda/2$ plate be rotated half the angle of that of the second grating. The embodiment of FIG. 2 (b) is perhaps more convenient, because of its simplicity in varying frequency and contrast independently. Deviation from the indicated settings of either one of the two $\lambda/4$ plates in FIG. 2 (b) or the $\lambda/2$ plate in FIG. 2 (c) results in a decrease of contrast of the fringes. Elliptical polarizers are then formed in FIG. 2 (b). In FIG. 2 (c), the directions of the vibrations established by the analyzer are no longer coincident with or perpendicular to those of the entering light. The irradiance of the bright fringes decreases at the same time that the irradiance of the darker fringes increases. Therefore, in view of this teaching, it is possible to obtain any value of contrast for moire-fringe patterns. Black fringes appear when $\phi(x,y) - \psi(x,y) = \pi(2n+1)/2$, where n is an integer and $\phi$ and $\psi$ represent the spatial variations of the directions of the transmittance axes of the two gratings.

Experimental results have shown that the sampling distance along the moire fringes in the polarization-type moire is half that of the absorption type. This increase of resolution is, of course, useful when the irregularity in a grating is displayed by moire. Relative displacement between two parallel polarization gratings result in patterns that can be varied from total extinction to an unstructed bright field. This result may be compared with the use of absorption gratings which result in patterns that can be varied from total extinction to a grating structure equal to that of the individual gratings. The moire pattern with binary polarization gratings, therefore, has double the munber of sampling prints of that with the use of absorption gratings.

An important parameter that may be varied in such use of the binary polarization grating is the opening ratio, i.e., the ratio between the strip width d and the grating period D. If a particular ratio d/D for one polarization component is chosen, then the ratio for the orthogonally polarized component is fixed, namely, 1 - d/D.

The significance of the ratio d/D may be seen by selecting two different ratios, for example, d/D = one-third and two-third for the two orthogonal polarization directions. Three different patterns may be formed with corresponding absorption gratings (with different opening ratios in the two gratings, four different patterns may be formed); however, two different patterns are formed with polarization gratings so defined. The first moire involving use of polarization gratings appears to be a combination of two moire patterns formed by the absorption gratings in that it is composed of one set of small diamonds interlaced with a set of large ones. Likewise, the second pattern formed by polarization gratings is a different combination of two of the three moire patterns formed by the absorption gratings in that two sets of parallelograms are inclined in different directions to form the pattern. In fact, the second pattern is the negative of the first. Transition between the two may be obtained by rotating one of the $\lambda/4$ plates in FIG. 2 (b) by an angle of $\pi/2$ or the $\lambda/2$ plate in FIG. 2 (c) by an angle of $\pi/4$.

Moire patterns were also formed from polarization gratings in which the transmittance axes were linearly rotated as a function of position in one dimension. In one embodiment, the polarization is rotated in the same sense or the opposite sense by rotating the two gratings with respect to each other. Conversion from one case to the other is obtained by rotating one of the gratings by an angle of $\pi$ or by introduction or removal of a $\lambda/2$ plate between the gratings. This conversion introduces a $\pi/2$ rotation of the moire pattern at the same time that its frequency changes from $2|\sin \alpha|D$ to $2|\cos \alpha|/D$. Where a $\lambda/2$ plate is employed, a rotation of the plate laterally shifts the fringe pattern perpendicularly to the fringes. A continuous variation may be simulated by changing the transmittance axes stepwise by $\pi/6$. As seen in former embodiments, the moire pattern which results consists of only one frequency, which may exceed that of the original gratings by a factor of 2.

Polarization gratings may also be formed of Vectograph material. For the formation of high-precision polarization gratings, Vectograph material may merely be coated with a positive photoresist on one side and a negative photoresist on the other. Exposure of this film with a periodic pattern of alternately dark and bright bars will, after processing, result in a polarization grating in which every other bar is orthogonally polarized with respect to the rest. Polarization gratings may also be formed in combining a Ronchi ruling and a birefringent plate. The plate is adjusted so that the two mutually orthogonally polarized images of the Ronchi ruling are interlaced as desired.

Spatial variation of polarization of the type illustrated in FIG. 1 (c) can be achieved by the introduction of a spatially varying path difference between vibrations and two mutually orthogonal directions. Crystal plates of suitable thickness perform the desired conversion of linearly polarized light into elliptically polarized light. For example, a Babinet compensator introduces a linear variation of phase difference in a direction perpendicular to the wedge edges, producing a polarization variation: linear-elliptical-circular-elliptically-linear (orthogonal to the previous linear one), etc., when the incident light is linearly polarized $\pi/4$ to the optical axes.

Periodic structures in which the direction of polarization varies continuously in space as shown in FIG. 1 (d) may be produced by using phenomena like optical activity or magneto-optical and electro-optical effects.

The state of polarization can also be controlled by using optical waveguides because the states of polarization of various waveguide modes are different. For example, a bundle of single-mode fibers could by proper spatial variation and orientation of the fiber cross section transfer an image, and at the same time introduce a spatial variation of polarization.

Figure 3:
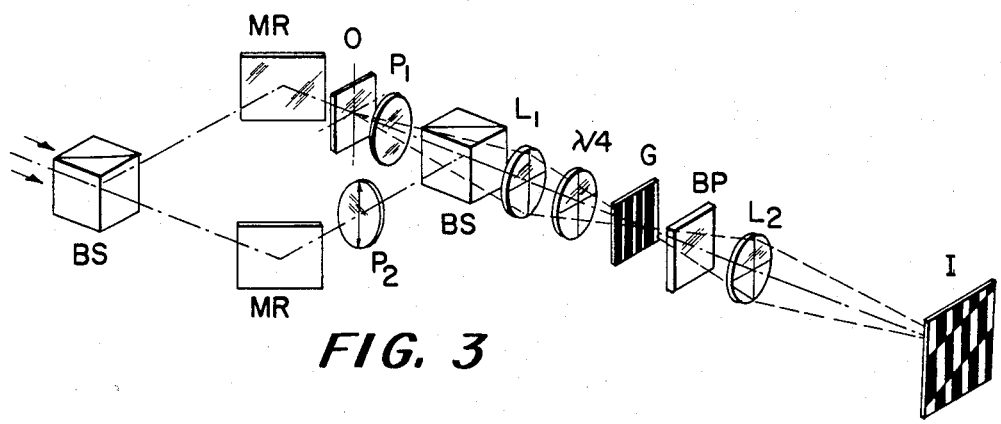
FIG. 3 shows a polarizing-interferometer arrangement in which the phase variation of an object is converted into a variation of polarization.
Figure 4:
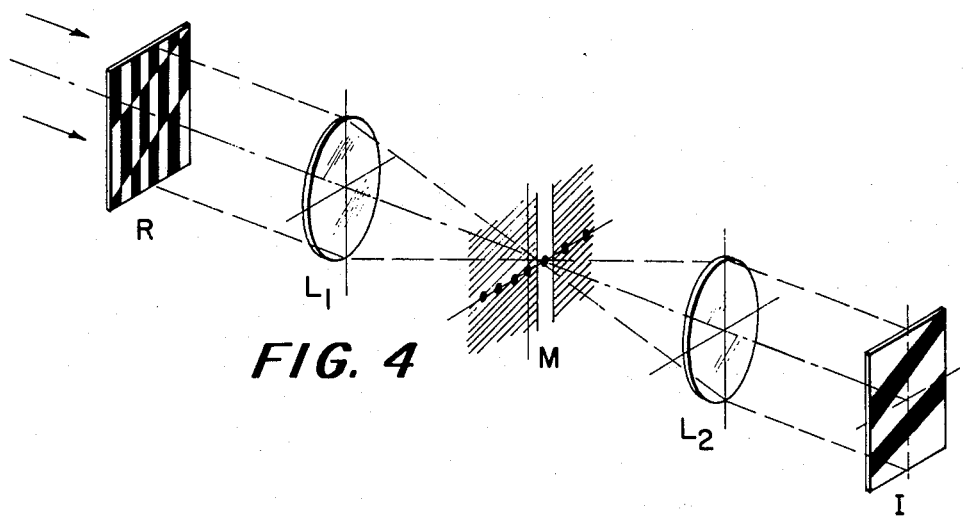
FIG. 4 shows an arrangement which provides for the spatial filtering of diffracted light from a recording obtained in FIG. 3.

An important application for which the polarization type of moire would be appropriate is an interferometer in which the phase variation of the object is converted into a polarization variation of the light. Two specific embodiments are described herein. The first would employ carrier-frequency concepts which result in doubling the number of fringes. In FIGS. 3 and 4 are shown apparatus which provide for the readability of interferograms of objects with small phase variations by decreasing the difference of phase between neighboring fringes. In FIG. 3 is shown the Mach-Zehnder type of interferometer, including beam spitters BS and mirrors Mr, which is modified so that the phase variations of the object O correspond to the variation of the plane of polarization in the output plane I. The two polarizations $P_1$ and $P_2$ together with a $\lambda/4$ plate are adjusted so that the object and the reference waves are circularly polarized orthogonal to each other. These states of polarization combine to a linear polarization, the direction of which is determined by the phase difference between the two waves. The lens $L_1$ images O onto a Ronchi ruling G, which in turn is imaged onto the output plane I with the lens $L_2$. By means of a birefringent plate BP, two images of G are formed in I. These images, which are mutually orthogonally polarized, are made to interlace by proper rotation of BP. Depending on the state of polarization in the interferogram, different portions of the light will go into the two images of G. Thus, the irradiance distribution in I will be periodic, with the period equal to that of the Ronchi ruling, and its modulation will be determined by the state of polarization. For two particular orthogonal directions of the polarization, the modulation will be zero.

The locations, which correspond to equal irradiance in the two interlaced images of G, can be filtered out by conventional spatial-filtering techniques, as employed in FIG. 4. If a recording R taken in the plane I of FIG. 3 is illuminated with collimated light, different diffraction orders occur. FIG. 4 shows how all but one of these orders are blocked with a mask M in the telecentric system $L_1$ and $L_2$. In the plane I of FIG. 4, dark fringes will occur where the modulation in the recording R is zero. The plane of polarization is rotated by $\pi/2$ between neighboring fringes. A phase difference of $2\pi$ corresponds to a rotation $\pi$ of the plane of polarization. Thus, twice as many fringes will occur with this scheme as with conventional interferometry.

Figure 5:
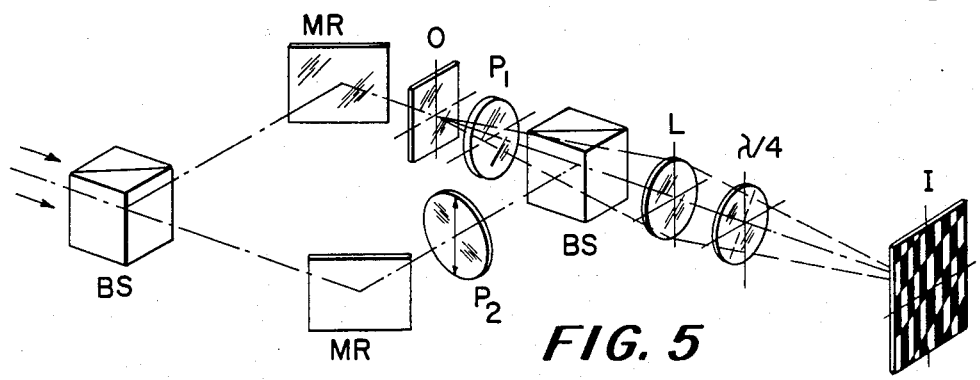
FIG. 5 shows an additional polarizing-interferometer arrangement in which the phase variations of the objects are converted into polarization variations.

Another embodiment utilizes the polarization grating as an analyzer in a polarization-type interferometer. In this application, the polarization-type moire is applied in a more direct way. Prior art uniform analyzers may be replaced by a polarization grating in accordance with the invention. In FIG. 5 is illustrated an embodiment of this approach. As in FIG. 3, The object O is placed in one arm of a Mach-Zehnder arrangement. The light in the image plane I is polarization modulated by means of the polarizers $P_1$ and $P_2$ and a $\lambda/4$ plate in such a way that a variation in phase in the object O correspond to a variation in the states of polarization. In the image plane I is placed a polarization grating that transforms the polarization pattern into an irradiance fringe pattern. Both types of gratings, i.e., alternate mutually orthogonally polarized strips and continuous variation of polarization, may be employed. In particular, the type of grating with continuous variation in the direction transmittance axes of the polarizer would be advantageous because the disturbing frequencies in the moire fringe pattern are absent with its utilization. In contrast to a strictly bipolar grating, a rotation $\pi$ of the type of grating which is linearly dichroic gives different results. Rotation of the latter type grating may, of course, be simulated by placing a $\lambda/2$ plate in front of the grating.

The polarization-type moire in accordance with the invention may be used for the same applications as conventional moire. Moreover, it is even of advantage in several situations because of its high resolution, lack or reduction of disturbing frequencies, large frequency range, and variable contrast. For example, these properties make it attractive as a variable frequency and contrast test object. In situations where polarization sensitive recording materials are used, polarization-type moire may be useful both for extraction of stored information and studies of the materials themselves. The present invention would also extend the use of moire techniques for decorative purposes and art.

In the extraction of metrological information, the characteristics of polarization-grating moire seem to be a valuable addition to already-existing moire techniques. In particular, polarization gratings with varying directions of the transmittance axes appear to be most significant. One possible application is in the measurement of rotation. A constant rotation of a $\lambda/2$ plate between two polarization gratings of the type (d) in FIG. 1 results in a linear fringe displacement. The fringe spacing is adjustable by proper setting of the angle between the gratings and the direction of fringe movement is dependent on the sense of rotation of the $\lambda/2$ plate. The reflection of light may even be applied to influence the polarization in that the reflection converts one kind of circular polarization into the orthogonally circular one.

Because of the vectorial character of polarization, a polarization grating must in general be characterized by two vectors, one representative of the spatial variation and the other representative of the polarization, as compared to the one vector in the case of absorption or phase gratings. Thus, several combinations of characteristics are possible in forming two-dimensional polarization gratings. For example, various configurations of two-dimensional polarization gratings would include both circular and radial gratings.

Other effects obeserved in superposing polarization gratings are that a $2\pi$ rotation of a one-dimensional polarization grating with continuous variation in the direction of the transmittance axes is needed to return to the original distribution of polarization and that a rotation $\pi$ results only in a mirror image of the original. Thus, in the case of two gratings with frequencies V1 and V2 it is possible to display either V1 + V2 or V1 − V2 by rotating the second analyzer grating through an angle $\pi$.

Additional types of variation of polarization other than those described above are possible. For example, a spatial distribution such as linear-elliptical-linear polarization, etc., can be realized by combining a continuous polarization grating with a retarder. Obviously, many modifications of the present invention are possible in light of this teaching. It is therefore to be understood that, in the scope of the appended claims, the invention may be practiced other than as specifically described.

What is claimed is:

1. Apparatus for the formation of moire-fringe patterns comprising a first grating structure having a periodic variation of polarization,
   at leat a second grating structure having a periodic variation of polarization positioned in superposition with said first grating structure in a defined optical path, and
   means for illuminating said grating structures whereby a moire-fringe pattern is formed.

2. The apparatus as defined in claim 1 wherein is further included in said optical path between said first and second grating structures a one-half wave plate for controlling the modulation of the moire-pattern in accordance with the angular position of said plate.

3. The apparatus as defined in cliam 1 wherein said grating structures are polarized in circular states.

4. The apparatus as defined in claim 3 wherein is further included low-pass filtering means for eliminating disturbing frequency components.

5. The apparatus as defined in claim 1 wherein said grating structures are formed of strips cut in different directions from linearly dichroic polarizer sheets.

6. The apparatus as defined in claim 5 wherein said grating structures are formed such that between successive strips a substantially constant rotation of the transmittance axes of said gratings occur.

7. The apparatus as defined in claim 1 wherein said grating structures are linear polarizers and wherein is further included two quarter-wave ($\lambda/4$) plates disposed in said optical path between said first and second grating structures for rotating the direction of polarization of said polarizers.

8. The apparatus as defined in claim 7 wherein said plates are attached to said polarizers such that the fast axes bisect the two orthogonal directions of said polarizers.

9. The apparatus as defined in claim 1 wherein said grating structures are binary polarizers.

10. The apparatus as defined in claim 1 wherein said grating structures are superposed such that the polarization states of the respective structures are orthogonal whereby maximum contrast in the moire pattern is obtained.

11. Apparatus for producing interferograms in an image plane from an illuminated object comprising:
    means for illuminating said object,
    means for polarizing the illumination from said object positioned in the optical path between said object and said image plane,
    said polarizing means having a periodic variation of polarization,
    means for splitting said illumination into at least two beams of radiation directed toward said image plane,
    means for imaging said illumination such that said beams interfere with one another to produce an interferogram in said image plane, and
    means for compensating said illumination prior to the formation of said interferogram such that the positional restraints of said polarizing means are substantially removed.

12. The apparatus as defined in claim 11 wherein said compensating means is a quarter-wave plate.

13. The apparatus as defined in claim 12 wherein said polarizing means comprises at least two polarizers, one of which is disposed in the optical path to function as a structured analyzer.

14. A method of producing interferograms in an image plane from an iluminated object comprising the steps of:
    illuminating said object to provide a beam of radiation toward said image plane,
    polarizing the beam from said object with polarization means having a periodic variation of polarization;
    splitiing said beam into at least two beams of radiation directed toward said image plane,
    imaging said beam of radiation such that said beams interfere with one another to produce an interferogram in said image plane, and
    compensating said directed radiation prior to the formation of said interferogram such that the locations of the fringes of said interferogram may be continuously controlled.

15. The method of claim 14 wherein said compensating step comprises positioning a compensator in the optical path between said object and said image plane.

16. The method of claim 15 wherein said compensator is a quarter-wave plate.

* * * * *